United States Patent [19]

Ohyama et al.

[11] Patent Number: 4,989,128
[45] Date of Patent: Jan. 29, 1991

[54] PULSE WIDTH MODULATION CONTROL UNIT OF INVERTER

[75] Inventors: Kazunobu Ohyama; Hiroyuki Yamai, both of Kusatsu, Japan

[73] Assignee: Daikin Industries, Ltd., Osaka, Japan

[21] Appl. No.: 340,023

[22] Filed: Apr. 18, 1989

[51] Int. Cl.$^5$ .............................................. H02M 1/12
[52] U.S. Cl. ....................................... 363/41; 363/132
[58] Field of Search ...................... 363/39, 40, 41, 43, 363/97, 98, 132

[56] References Cited

U.S. PATENT DOCUMENTS

| | | | |
|---|---|---|---|
| 4,322,786 | 3/1982 | Weber | 363/21 |
| 4,622,628 | 11/1986 | Murasaki et al. | 363/37 |
| 4,691,269 | 9/1987 | Yamane et al. | 363/41 |
| 4,713,220 | 12/1987 | Huynn et al. | 363/132 X |
| 4,829,416 | 5/1989 | Inaba et al. | 363/41 |
| 4,870,556 | 9/1989 | Inaba et al. | 363/41 |

FOREIGN PATENT DOCUMENTS 0224874 10/1986 Japan .

OTHER PUBLICATIONS

"Power Electronics and AC Drives"; Bose; Prentice-Hall; 1986; 374–375.

*Primary Examiner*—Steven L. Stephan
*Assistant Examiner*—Kristine Peckman
*Attorney, Agent, or Firm*—Wenderoth, Lind & Ponack

[57] ABSTRACT

In a pulse-width modulation control unit for an inverter, in the case where the carrier frequency is a normal value of about 5 KHz, the control unit calculates the ON time (the PWM control pattern) at every calculation period corresponding to such a carrier frequency and divides the calculation ON time into plural pulses. This enables the control unit to present apparently such conditions that the PWM control was carried out at a higher carrier frequency (20 KHz or higher), while using a one-chip microcomputer which requires a comparatively long calculation time. Thus, the PWM control by a higher carrier frequency can be attained at a lower cost and by a simple circuit construction.

14 Claims, 16 Drawing Sheets

| VOLTAGE VECTOR | $V_0 \to V_4 \to V_6$ | $V_4 \to V_6 \to V_7$ | $V_7 \to V_6 \to V_4$ | $V_6 \to V_4 \to V_0$ |
|---|---|---|---|---|
| a-PHASE TRANSISTOR Ta | 0 1 1 | 1 1 1 | 1 1 1 | 1 1 0 |
| b-PHASE TRANSISTOR Tb | 0 0 1 | 0 1 1 | 1 1 0 | 1 0 0 |
| c-PHASE TRANSISTOR Tc | 0 0 0 | 0 0 1 | 1 0 0 | 0 0 0 |
| | Fig 5 (a) | Fig. 5 (b) | Fig 5 (c) | Fig 5 (d) |

PULSE WIDTH MODULATION CONTROL UNIT OF INVERTER

BACKGROUND OF THE INVENTION

1. Field of the Invention

This invention relates to a pulse width modulation control unit of an inverter, and more particularly, to an improvement in the precise waveform control effected by increasing the carrier frequency.

2. Description of the Prior Art

As a high-speed switching device, elements such as MOSFETS (metal oxide film gate field effect transistors) have been developed in recent years. The pulse width modulation control unit of an inverter in which MOSFETS were introduced is already known from U.S. Pat. No. 4,691,269, for example. This control unit is capable of effecting precise waveform control and therefore a reduction in electromagnetic noise and an improvement in motor efficiency can be expected from it.

In the above cited U.S. patent, as disclosed in its specification from line 48, column 3 to line 62, column 4, the control of the pulse width modulation by a high carrier frequency is made possible by providing special hardware composed of analog control circuits. The control of the pulse width modulation by a high carrier frequency (20 KHz, for example) is also possible using a high-speed arithmetic operator, such as special hardware composed of digital circuits, a DSP (digital signal processor), or the like.

Also, control of the pulse width modulation of an inverter using a microcomputer is known from U.S. Pat. No. 4,622,628.

However, the use of a high-speed arithmetic operator, such as hardware composed of analog control circuits or digital circuits involves such drawbacks as intricacy of circuits, complexity of various regulations, higher costs, etc.

It is therefore conceivable to adopt a one-chip microcomputer which is low in cost and simple in circuit composition. This idea, however, as stated in "Power Electronics and AC Drivers" (written by B. K. Bose, published by Prentice-Hall Inc.), involves a long operating time of a microcomputer (about 200 μS) for a series of processes required for the generation of PWM control patterns and this operating time corresponds to a carrier frequency of about 5 KHz at a maximum. Therefore, the pulse width modulation control by a high carrier frequency (more than 20 KHz) is difficult.

SUMMARY OF THE INVENTION

An object of the present invention is to make it possible to carry out pulse width modulation control at an equivalently high carrier frequency with a cheap and simple circuit composition, while adopting a one-chip microcomputer, by raising the carrier frequency to obtain such effects as a reduction in electromagnetic noise, an improvement in motor efficiency, etc. by precise waveform control.

In order to attain the above object, in the present invention, an algorithm which generates PWM control patterns (namely, the ON time of plural switching elements provided in the inverter), is changed and each ON time is divided into plural pulses, even if the calculating time (calculating cycle) of the PWM control pattern is long, so as to equivalently raise the carrier frequency.

Concretely, the pulse width modulation of an inverter provided with a bridge circuit which is connected to a three-phase winding and has plural elements (Tra)∼(Trc') is arranged such that a DC voltage is pulse-width modulated by the ON/OFF transition of each switching element (Tra)∼(Trc') of the bridge circuit and three-phase AC voltage is supplied to the three-phase winding, as shown in FIG. 1 and FIG. 2. As shown in FIG. 6 and FIG. 7, the device according to the present invention comprises an arithmetic operating means which calculates the ON time of each switching element (Tra)∼(Trc') by the operating cycle corresponding to carrier frequency, a dividing means which divides the ON time of each switching element (Tra)∼(Trc'), calculated by said arithmetic operating means, into plural pulses and a controlling means which controls the ON time of each switching element (Tra)∼(Trc') with plural pulses obtained by dividing the ON time into a plural number of pulses by the dividing means.

Under the above construction of the present invention, even if the carrier frequency is of a normal value (about 5 KHz, for example), the ON time (PWM control pattern) of each switching element (Tra)∼(Trc') is calculated repeatedly by the arithmetic operating means at every operating cycle (about 200 μS) corresponding to the above carrier frequency. Since the ON time of each switching element (Tra)∼(Trc') is divided into plural pulses (four pulses, for example) by the dividing means, the carrier frequency is increased by such a divisor and this enables the pulse width modulation control to be effectively carried out at a correspondingly high carrier frequency. As a result, if each switching element (Tra)∼(Trc') has its ON time controlled by the controlling means with each divided pulse, a precise output waveform close to a sine wave is obtained, with the result that electromagnetic noise is effectively reduced and the motor efficiency is effectively raised.

In the above case, the carrier frequency for pulse width modulation control is a normal value (about 5 KHz) and the PWM control pattern can be calculated well even by a one-chip microcomputer which involves a long calculating time. Therefore, the pulse width modulation control by a high carrier frequency can be carried out at a low cost and with a simple circuit construction.

The above object and novel features of the present invention will be understood more clearly by reading the following detailed description, with reference to the accompanying drawings

BRIEF DESCRIPTION OF THE DRAWINGS

The accompanying drawings show preferred embodiments of the present invention.

FIG. 1 through to FIG. 9 shown an embodiment of the present invention, of which FIG. 1 is a block diagram of the whole system; FIGS. 5 (a)-5 (d) are respectively explanatory drawings of kinds of PWM control patterns which are obtainable within the range of $0 \leq \phi \leq \pi/3$ of angle $\phi$.

FIG. 10 through FIG. 15 show a first modified example, in which FIG. 10 and FIG. 11 are flowcharts in the case where a transistor is ON/OFF controlled with pulses of unequal width; FIG. 12 is an explanatory drawing, showing the state of interpolation of each divided pulse in the case where the ON time is divided into pulses of unequal width; FIG. 13 is an explanatory drawing of the operation in the case where the ON time is divided into pulses of unequal width; FIG. 14 is an explanatory drawing, showing the state of reproduction of a waveform in the case of division into pulses of unequal width.

FIG. 16 and FIG. 17 show a second modified example, in which FIG. 16 is a block diagram of a microcomputer and FIG. 17 is an explanatory drawing, showing the state of interpolating the divided pulses.

FIG. 18 and FIG. 19 show a third modified example, in which FIG. 18 is a block diagram of a microcomputer in the case where the ON time of a transistor is divided into pulses of equal width or pulses of unequal width according to the rate of change of the angle of a signal wave which becomes a criterion in the case where a choice is provided between the division into pulses of equal width and the division into pulses of unequal width.

FIG. 20 and FIG. 21 show a fourth modified example, in which FIG. 20 is a block diagram of the whole device and FIG. 21 is a drawing, showing a waveform of the torque generated by an electric motor.

FIG. 22 through to FIG. 24 show a fifth modified example, in which FIG. 22 is a block diagram of a microcomputer in the case where the number of divisions of the ON time is set variably accordingly to the rate of change of the ON time of a transistor.

FIG. 25 and FIG. 26 show a sixth modified example, in which FIG. 25 is an explanatory drawing of the state of reproduction of a waveform and FIG. 26 is a flowchart showing the pulse width control for preventing the short-circuit of arms located at the upper and lower parts of the inverter.

DETAILED DESCRIPTION OF THE PREFERRED EMBODIMENTS

Each of preferred embodiments of the present invention is explained below, with reference to accompanying drawings.

Figure 1:
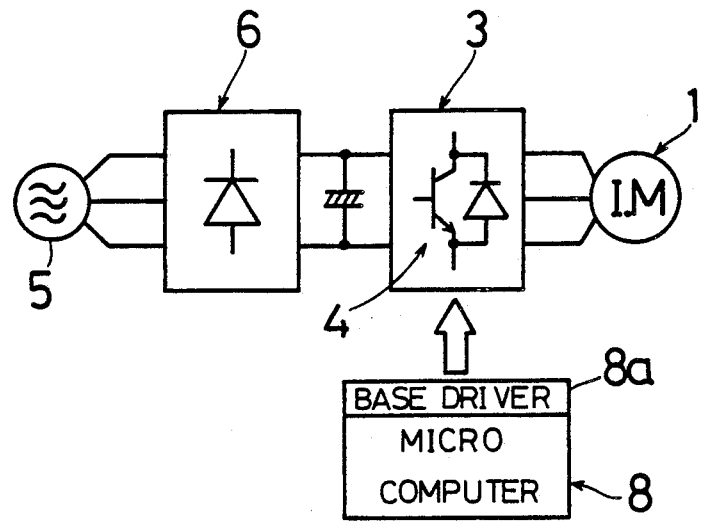
Figure 2:
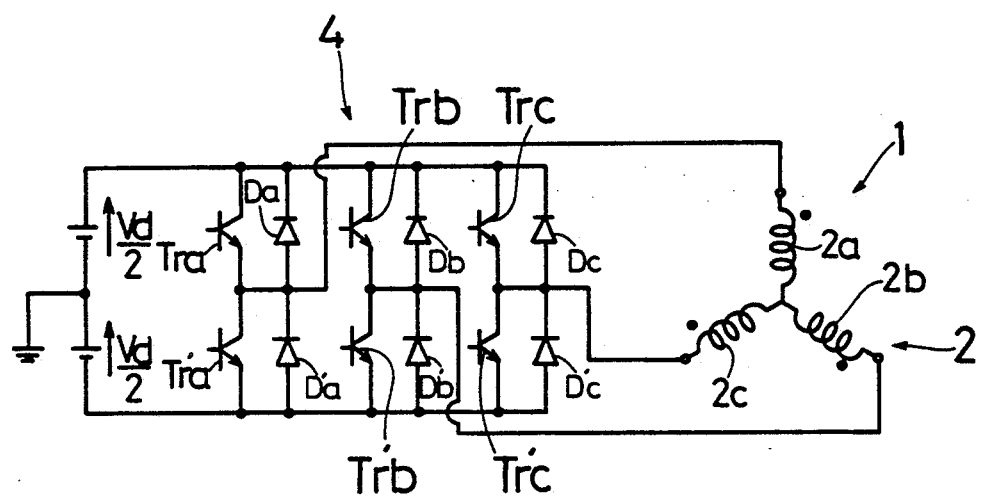
FIG. 2 is a circuit diagram of a voltage type inverter.

FIG. 1 and FIG. 2 show a pulse width modulation (hereinafter abbreviated as PWM) control unit. In these figures, reference numeral 1 designates an induction motor having a three-phase winding 2 with three windings 2a, 2b, 2c which are Y-connected. Reference numeral 3 designates a voltage inverter connected to the induction motor 1. The inverter 3 is provided with a transistor bridge circuit 4 connected to the three-phase winding 2 of the induction motor 1. The bridge circuit 4 has plural (six) transistors, such as MOSETS, (switching elements) (Tra), (Tra'), (Trb), (Trb'), (Trc), (Trc'), each having a reflux diode (Da)~(Dc'). A DC voltage is supplied to the inverter 3 from a rectifier 6 which rectifies the three-phase AC of a three-phase power source 5.

Reference numeral 8 designates a one-chip microcomputer which forms the ON time (namely, PWM control pattern) of the six transistors (Tra)~(Trc') of the bridge circuit 4. The microcomputer 8 is provided with a base driver 8a which controls the ON/OFF operation of the transistors (Tra)~(Trc'). By controlling the ON/OFF operation of the transistors (Tra)~(Trc') using the microcomputer 8, the DC is pulse-width modulated.

An explanation is provided below of the formation of PWM pattern by the microcomputer 8.

In brief, the formation of PWM control pattern is provided by determining the PWM control pattern so as to make a locus of time integral of output voltage resemble a circular locus. To be more precise, suppose va, vb, vc are the voltages of the output terminals of the inverter 3 and vn is the voltage of a neutral point of the three-phase winding 2 and also the output voltage vector Vp and time integral λp of the voltage vector Vp which are defined by the following formulae are taken into consideration.

$$Vp = \sqrt{2/3} \cdot \{va + a^2 \cdot vb + a \cdot vc\}$$

where $a = e^{j\frac{2}{3}\pi}$ $$\lambda p = \int Vp \, dt$$

The voltage vector Vp and time integral λp of the voltage vector, when a balanced three-phase voltage of an angular frequency ω is added to the three-phase winding 2 of the inductor motor 1, generates a circular locus on a complex plane.

$$\begin{pmatrix} va - vn \\ vb - vn \\ vc - vn \end{pmatrix} = \sqrt{2/3} \cdot V_1 \begin{pmatrix} \cos\omega t \\ \cos(\omega t - 2\pi/3) \\ \cos(\omega t + 2\pi/3) \end{pmatrix}$$

($V_1$ = Effective voltage of fundamental wave)

Figure 3:
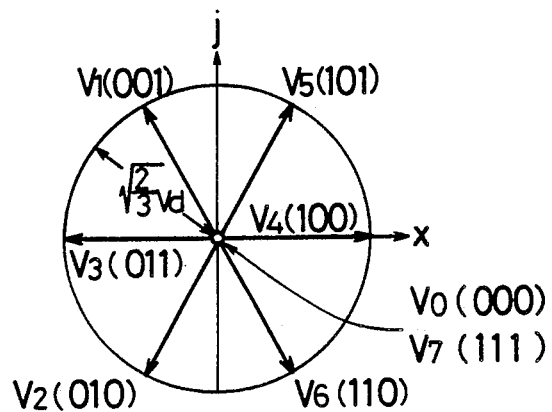
FIG. 3 is an explanatory drawing, showing the state of a voltage type inverter with eight voltage vectors.

On the other hand, in the voltage type inverter 3, since either of the two transistors in each phase is always in an ON state, if for convenience' sake the ON state of the transistor on the (+) side is expressed by a "1" and the ON state of the transistor on the (−) side is expressed by a "0" and "101", "011" ... are inscribed in the order of a-phase, b-phase and c-phase, the inverter 3 has eight different states. The voltage vector Vp (P=~7) of each state is $\sqrt{\frac{2}{3}}$Vd (Vd=DC voltage of the rectifier 6) in magnitude and its direction is as shown in FIG. 3. V₀ and V₇ are zero vectors. Since the time integral of the above voltage vector λp is dλp/dt=Vp, the time integral of the inverter 3 (while it is being driven) λp moves at the speed of Vp=$\sqrt{\frac{2}{3}}$Vd in the direction of voltage vector Vp. (However, it is kept standing in the case of the zero vector).

From the above PWM control pattern of the voltage type inverter 3 is determined by selecting a voltage vector VP properly so that a vector locus on a complex plane of the time integral λP of voltage vector moves at an angular velocity ω along the circumference of a circle of the designated radius R (the designated radius $R=V_1/\omega$, where $V_1$ is an effective value of the linear voltage of the voltage of fundamental wave, $\omega$ is angular frequency).

Figure 4:
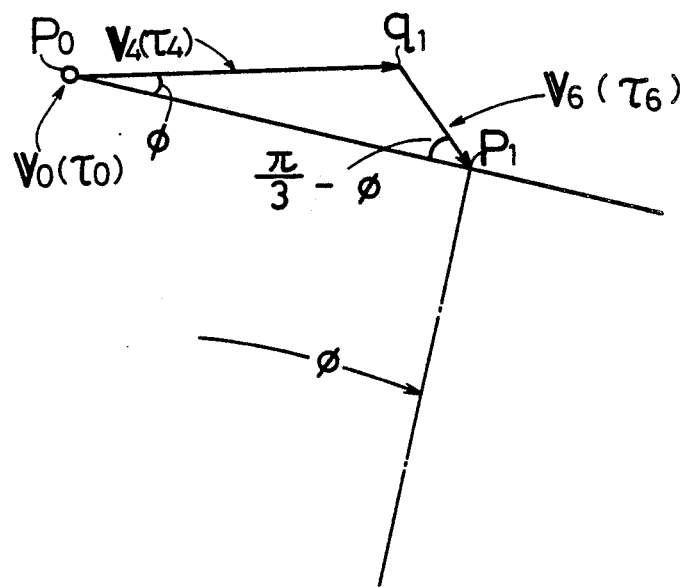
FIG. 4 is an explanatory drawing of voltage vector control for making a locus of the time integral of voltage vector on a complex plane resemble a circuit locus.

More particularly, such a case is taken into consideration as shown in FIG. 4, for example, when the angle $\phi$ is within the range of $0 \leq \phi \leq \pi/3$ and $V_4$, $V_6$ and a zero vector ($V_0$, for example) are used, the voltage vector halts at the point $P_0$ for the time $\tau_0$ (this state is shown by the symbol 0), then $V_4$ reaches the point $q_1$ in the time $\tau_6$. In this case, in $\Delta P_0 q_1 P_1$ $$\overline{P_0 P_1} \approx V_1 \cdot T_0$$

$$\overline{P_0 q_1} = \sqrt{2}/3 Vd \cdot \tau_4$$

$$\overline{q_1 P_1} = \sqrt{2}/3 Vd \cdot \tau_6$$

and $\tau_0 + \tau_4 + \tau_6 = T_0$

Therefore, by solving the above formulae, the times $\tau_4$, $\tau_6$, $\tau_0$ taken by voltage vector $V_4$, $V_6$, and $V_0$ within the period $T_9$ are obtained.

$$\tau_4/T_0 = ks \cdot \sin(\pi/3 - \phi_0)$$

$$\tau_6/T_0 = ks \cdot \sin\phi_0$$

$$\tau_0/T_0 = 1 - ks \cdot \sin(\phi_0 + \pi/3) \quad (3)$$

where, ks is voltage control rate or $$ks = \sqrt{2} \, V_1/Vd$$

The above (3) formulae are relative formulae when the angle $\phi$ is within the range of $0 \leq \phi \leq \pi/3$ but in other angular ranges since the inverter 3 performs symmetrical three-phase motion, the relative formulae within the angle range of $0 \leq \phi \leq 2\pi$ are obtained by permutating each symbol as shown in the following Table 1.

TABLE I

| Symbol | $0 \sim \pi/3$ | $\pi/3 \sim 2\pi/3$ | $2\pi/3 \sim \pi$ | $\pi \sim 4\pi/3$ | $4\pi/3 \sim 5\pi/3$ | $5\pi/3 \sim 2\pi$ |
|---|---|---|---|---|---|---|
| $\phi_0$ | $\phi_0$ | $\phi_0 - \pi/3$ | $\phi_0 - 2\pi/3$ | $\phi_0 - \pi$ | $\phi_0 - 4\pi/3$ | $\phi_0 - 5\pi/3$ |
| $\tau_4$ | $\tau_4$ | $\tau_6$ | $\tau_2$ | $\tau_3$ | $\tau_1$ | $\tau_5$ |
| $\tau_6$ | $\tau_6$ | $\tau_2$ | $\tau_3$ | $\tau_1$ | $\tau_5$ | $\tau_4$ |
| $\tau_0$ | $\tau_0$ | $\tau_0$ | $\tau_0$ | $\tau_0$ | $\tau_0$ | $\tau_0$ |

On the basis of the time $\tau$ of the voltage vector in the above (3) formulae, the ON/OFF pattern (PWM control pattern) of each transistor (Tra)~(Trc') is obtained. In this case, since the relationship between the time $\tau$ of the voltage vector and PWM control pattern changes in accordance with the order in which voltage vector is taken, if for simplicity's sake restrictive conditions are set such that the same pattern is repeated in each period $T^0$ and the ON/OFF switching of a transistor in each period $T^0$ is limited to one switching, then PWM control patterns are represented by four patterns shown by FIGS. 5(a)–(d) (in the figure, $\tau^+$ and $\tau^-$ respectively show the ON time of the transistor on the (+) side and the ON time of the transistor on the (−) side).

Of the above four PWM control patterns, it is preferable to adopt the pattern of FIG. 5(a) or FIG. 5(b), showing a slightly larger amplitude of output voltage of fundamental wave.

In the voltage type inverter 3, the PWM control pattern can be determined by the following formulae, with reference to the above (3) formulae and FIG. 5(a)–(d), provided that the angle $\phi$ is within the range of $0 \leq \phi \leq \pi/3$.

(Formulae a)

$$\tau a^-/T_0 = 1 - \sqrt{2} \cdot (V_1/Vd) \cdot \sin(\phi_0 + \pi/3) \quad (4)$$

$$\tau b^-/T_0 = 1 - \sqrt{2} \cdot (V_1/Vd) \cdot \sin\phi_0$$

$$\tau c^-/T_0 = 1 \quad \text{(ON at all times)}$$

(Formulae b)

$$\tau a^+/T_0 = 1 \quad \text{(ON at all times)} \quad (5)$$

$$\tau b^-/T_0 = \sqrt{2} \, (V_1/Vd) \cdot \sin(\pi/3 - \phi_0)$$

$$\tau c^-/T_0 = \sqrt{2} \, (V_1/Vd) \cdot \sin(\phi_0 + \pi/3)$$

The relative formulae (4) of the PWM control pattern within the above range of $0 \leq \phi \leq \pi/3$ can be relative formulae if each symbol is permutated as shown in the following Table II in the same way as stated before. If the ON time of each switching element is calculated on the basis of calculation formulae of the above (4) or (5) relative formulae, not only can the calculating time be comparatively reduced but also either of two transistors can always be controlled and the PWM control patterns can be calculated by only two sets of timers (a savings of one set of timers). An explanation of how to properly use the above (4) and (5) relative formulae is noted below.

In the case where it is necessary, from the restriction on hardware, to arrange a zero vector at the first of the period $T_0$, the (4) formulae are used and in the case where it is necessary to arrange a zero vector at the last of the period $T_0$, the (5) formulae are used. In this embodiment, the PWM pattern in FIG. 5(a) is adopted and the (4) formulae are used.

TABLE II

| Section (N) | ON time $\phi_0$ | Function of $\sin(\pi/3) \sim \sin(2\pi/3)$ | Function of $\sin 0 \sim \sin(\pi/3)$ | ON at all times |
|---|---|---|---|---|
| 0 | $0 \sim \pi/3$ | $\tau a^-$ | $\tau b^-$ | $\tau c^-$ |
| 1 | $\pi/3 \sim 2\pi/3$ | $\tau c^+$ | $\tau a^+$ | $\tau b^+$ |
| 2 | $2\pi/3 \sim \pi$ | $\tau b^-$ | $\tau c^-$ | $\tau a^-$ |
| 3 | $\pi \sim 4\pi/3$ | $\tau a^+$ | $\tau b^+$ | $\tau c^+$ |
| 4 | $4\pi/3 \sim 5\pi/3$ | $\tau c^-$ | $\tau a^-$ | $\tau b^-$ |
| 5 | $5\pi/3 \sim 2\pi$ | $\tau b^+$ | $\tau c^+$ | $\tau a^+$ |

The permutation table in the above Table II is stored beforehand in the microcomputer 8.

The operation of the one-chip microcomputer 8 is explained below, on the basis of the flowcharts of FIG. 6 and FIG. 7 and with reference to FIG. 8.

Figure 6:
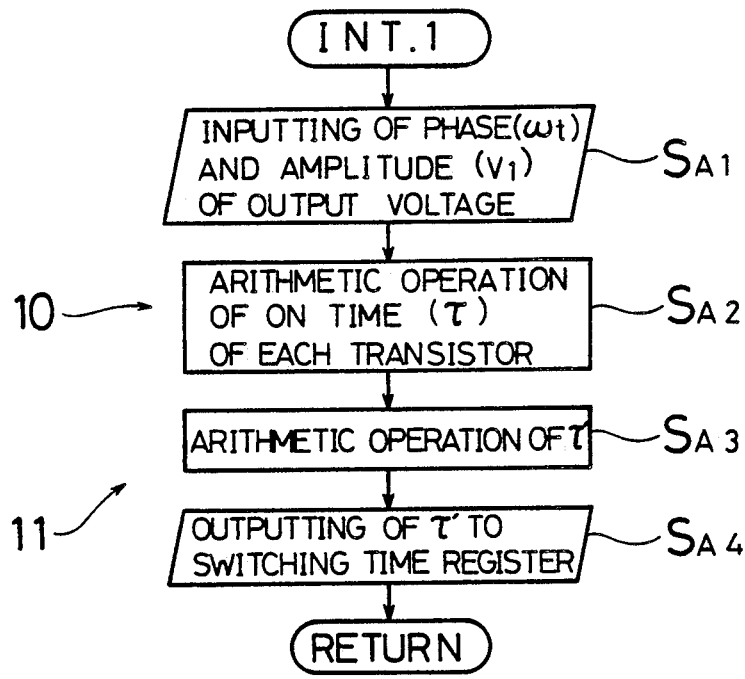
FIG. 6 and FIG. 7 are flowcharts showing the ON/OFF control of each transistor by a one-chip microcomputer.
Figure 7:
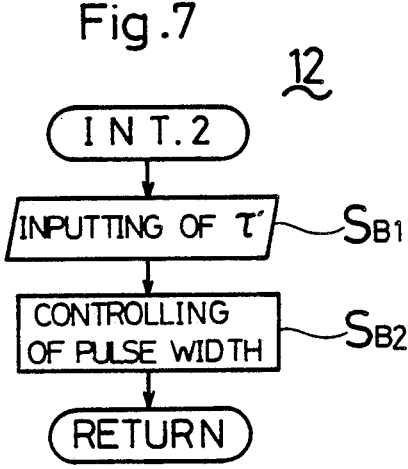

The flowchart of FIG. 6 is for calculating the ON time (PWM control pattern) of each transistor (Tra)~(Trc') and the flowchart of FIG. 7 is for actually controlling each transistor (Tra)~(Trc').

Referring first to the flowchart of FIG. 6, the program by this flowchart is carried out repeatedly for every operation period $T_0$ (200 $\mu$S, for example) corresponding to a particular carrier frequency (5 KHz, for example). First, the phase $\omega t(=\phi_0)$ of the output voltage and the amplitude $V_1$ of the output voltage are inputted at the step $S_{A1}$. Then the ON time $\tau(n+1)$ of each transistor $(Tra) \sim (Trc')$ is calculated on the basis of the relative formulae (4) of PWM control pattern and the permutation table of Table II at the step $S_{A2}$. At the step $S_{A3}$, the ON time $\tau(n+1)$ of each transistor $(Tra) \sim (Trc')$ thus calculated is divided by the preset numerical value N (4, for example) into N (4) pulses $\tau'(n+1)(\tau'(n+1)=\tau(n+1)/4)$. Then, at the step $S_{A4}$, the divided pulse $\tau'(n+1)$ is stored in a switching time register for each phase (in the voltage inverter, since one of the two transistors is always in an ON state in the arms of each phase, one register is enough for each phase), and "RETURN".

In the case of the flowchart of FIG. 7, its repetition period $T_0'$ is quicker than the calculation period $T_0$ of FIG. 6 and is set at $T_0'=T_0/N$ in accordance with the number of divisions N (4) of the ON time $\tau(n+1)$ (it is preferable that the number of divisions N is determined to be $N=2^m(m=1,2 \ldots )$, by which divisions can be practiced only by shifting. After the divided pulse $\tau'(n+1)$ was stored in a switching time register for each phase in the flow chart of FIG. 6, during the next calculation period $T_0$ the contents of the switching time register are inputted at the step $S_{B1}$ as shown in FIG. 8 and transistors $(Tra) \sim (Trc')$, which have their ON time controlled by the divided pulse $\tau'(n+1)$, ON time controlled by the divided pulse $\tau'(n+1)$ at the step $S_{B2}$, and "RETURN".

In the flowchart of FIG. 6, an arithmetic operation means 10 is provided by which at the step $S_{A1}$ and at the step $S_{A2}$, the ON time $\tau(n+1)$ of each transistor (switching element) $(Tra) \sim (Trc')$ is calculated during the calculation period according to the carrier frequency (5 KHz) and on the basis of the above relative formulae (4) of the PWM control pattern and the transistors $(Tra) \sim (Trc')$ which require the calculated ON time $\tau(n+1)$ are specified on the basis of the permutation table of Table II. A dividing means 11 is also provided by which at the step $S_{A3}$, the ON time $\tau(n+1)$ of each transistor $(Tra) \sim (Trc')$ calculated by the above noted arithmetic operation means 10 is divided into N $(N=4)$ $\tau'(n+1)$. A controlling means 12 is further provided by which each transistor $(Tra) \sim (Trc')$ has its ON time controlled by $N(N=4)$ pulses $\tau'(n+1)$ obtained by dividing the ON time into a plural number of pulses by the dividing means 11.

Figure 8:
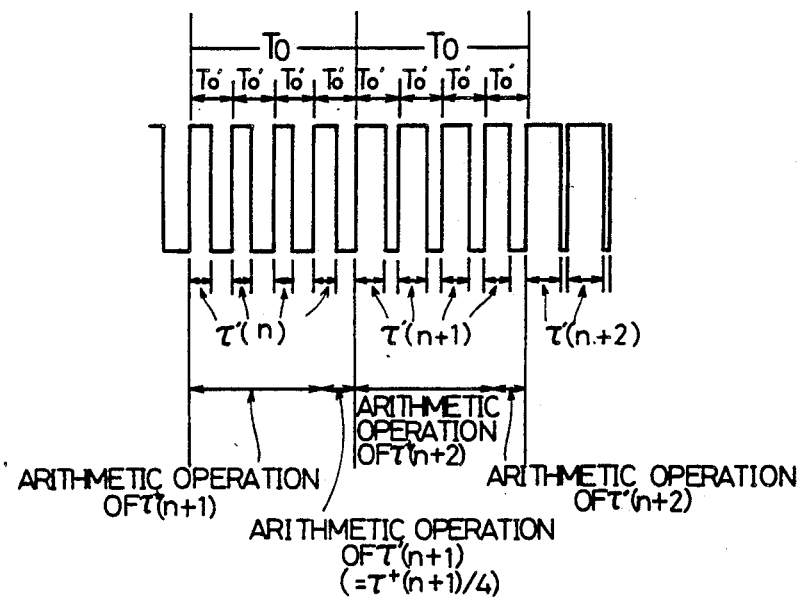
FIG. 8 is an explanatory drawing, showing that the carrier frequency has risen correspondingly.
Figure 9:
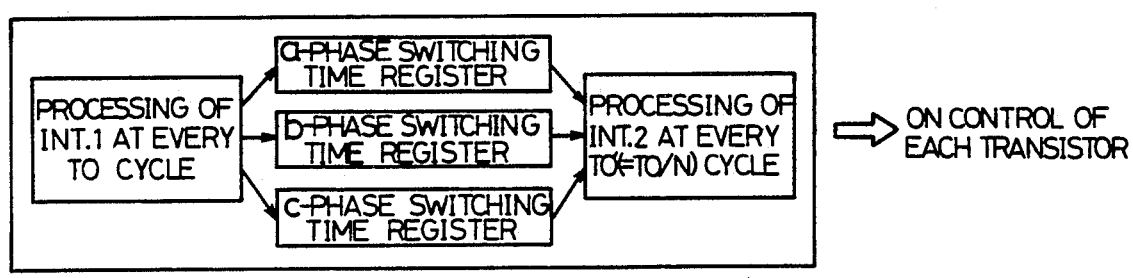
FIG. 9 is an explanatory drawing of the operation of the circuit.

Therefore, in the above embodiment, as shown in FIG. 8 and FIG. 9, the ON time $\tau(n+1)$ of each transistor $(Tra) \sim (Trc')$ is calculated by the program of the flowchart for calculating PWM control patterns (FIG. 6) and on the basis of the relative formulae (4) of PWM control pattern and transistors $(Tra) \sim (Trc')$ have their ON time controlled by the arithmetic operation means 10 on the basis of the permutation table of Table II. Therefore, each ON time $\tau(n+1)$ is divided into a plurality $N(4)$ of pulses $\tau'(n+1)(\tau'(n+1)=\tau(n+1)/4)$ and such divided pulses $\tau(n+1)$ are stored in the switching time register of each phase a, b, c.

Figure 27:
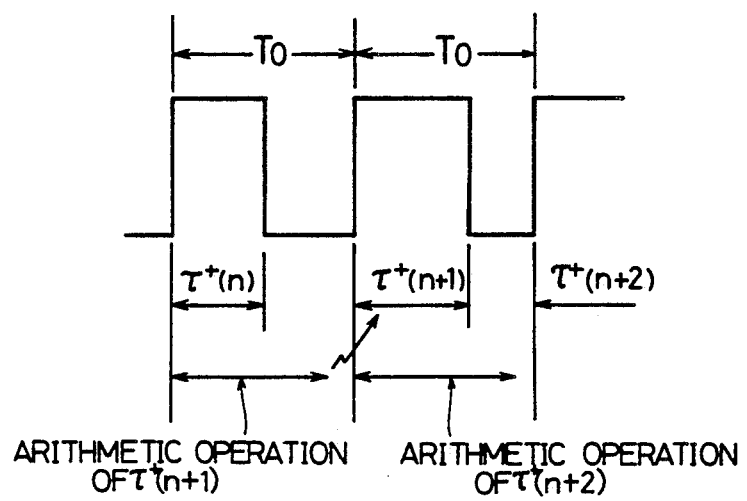
FIG. 27 is an explanatory drawing, showing a conventional example.

In the next calculating period $T_0$, as shown in FIG. 8, the calculation of the ON time $\tau(n+2)$ of each transistor $(Tra) \sim (Trc')$ and the division of the ON time $\tau(n+2)$ are carried out again in this period $T_0$. In this period $T_0$, at every $T_0/N(=T_0')$ period, the specified each transistor $(Tra) \sim (Trc')$ has its ON time controlled by the controlling means 12 with the divided pulse $\tau'(n+1)$ in the switching time register of each phase a, b, c obtained in the preceding period $T_0$ and therefore, as compared with the conventional arrangement (wherein the ON time is not divided into plural pulses) as shown in FIG. 27, this process can effectively raise the frequency of the high-frequency element and can equivalently increase the carrier frequency by the number of divisions N $(N=4)$ of the ON time, namely, can change the original carrier frequency (5 KHz) to a high carrier frequency (20 KHz). FIG. 8 and FIG. 27 respectively show the ON time of a transistor on the (+) side of each phase.

Since the original carrier frequency (5 KHz), namely, the calculation period $T_0$ (200 $\mu$S) of ON time is a period during which PWM control patterns can well be calculated even by a one-chip microcomputer 8, it is possible to carry out PWM control at a high carrier frequency (about 20 KHz) by using a one-chip microcomputer 8. Accordingly, it is made possible to reduce the cost of a device, to simplify the circuit construction and to carry out a precise waveform control on a three-phase AC waveform to the induction motor 1 by making the most of high-speed switching elements, such as MOSFETS, with the result of a reduction in electromagnetic noise and an improvement in motor efficiency.

In the case of using the conventional carrier frequency (5 KHz), the arithmetic operating time of one-chip microcomputer 8 can be reduced and the processing ability other than PWM control can be increased.

In the dividing means 11, since the ON time $\tau(n+1)$ is divided into N (4) pulses $\tau'(n+1)(\tau'(n+1)=\tau(n+1)/4)$, the calculation time can be reduced to a short time because only division is required and the calculation period $T_0$ of the flowchart of FIG. 6, namely, the carrier frequency of PWM control can be raised more.

Since the calculation of the ON time $\tau(n+1)$ of each transistor $(Tra) \sim (Trc')$ is carried out on the basis of the above calculation formulae (4), with less times of addition and subtraction, its calculating time can be reduced and one transistor can have its ON time controlled at all times. Besides, only two sets of timers corresponding to the other two phases are required and accordingly the circuit construction can be simplified even more. Furthermore, the transistor which has an ON time calculated on the basis of the calculation formulae (4) is specified on the basis of the permutation table of Table II stored beforehand and the calculation of the ON time can be carried out evenly throughout the whole range $(0 \leq \phi \leq \pi)$ of phase $\phi$. Therefore, the calculation time of the ON time $\tau$ of each transistor $(Tra) \sim (Trc')$ can be reduced still further and pulse-width modulation by a higher carrier frequency can be carried out.

In the above embodiment, the ON time of each transistor $(Tra) \sim (Trc')$ is calculated on the basis of the relative formulae (4) of PWM control pattern and then this ON time is divided into the plural number of pulses N but it is possible to change the relative formulae (4) to the formulae divided by a set numerical value N $(N=4)$ and to calculate the divided pulse $\tau'(n+1)$ directly.

Instead of the calculation of the ON time $\tau(n+1)$ of each transistor $(Tra) \sim (Trc')$ at the step $S_{A2}$ in the flowchart of FIG. 6, it is possible to provide an ON time table which stores beforehand the calculated result within the range of $0 \sim \pi/3$ of phase $\phi_0$. This will make calculation of the ON time $\tau(n+1)$ of each transistor $(Tra) \sim (Trc')$ easier and can reduce the amount of memory needed.

That part of the contents of a switching time register of each phase which is converted to a pulse-width can be processed by hardware, such as an externally connected IC for pulse-width modulation. Under the composition shown in FIG. 9, even if the carrier frequency changes due to the change of switching elements, the change of the dividing means 11 and the controlling means 12 will suffice. The common use of the switching time register and a register of the pulse-width controlling part (step $S_{B2}$) will dispense with the process of the step $S_{B1}$ in FIG. 7.

The calculation period $T_0$ of the calculation flow of PWM control pattern is necessarily determined by the time required for actually calculating the PWM control pattern, but the period $T_0'0$ of the ON time control of the transistors in the flowchart of FIG. 7 is determined according to the desired carrier frequency, for which the value of the number of divisions $N(T_0/T_0')$ of the ON time of each transistor should be set properly.

An explanation is provided below with regard to the first modified example of the above embodiment. This modified example divides the ON time of each transistor (Tra)~(Trc') into plural pulses of unequal width. The explanation is provided with reference to FIG. 10 through to FIG. 15.

The division into pulses of unequal width is carried out by linear-interpolating between the ON time $\tau(n)$ of a transistor in the period $T_0$ and the ON time $\tau(n+1)$ in the succeeding period $T_0$.

Figure 10:
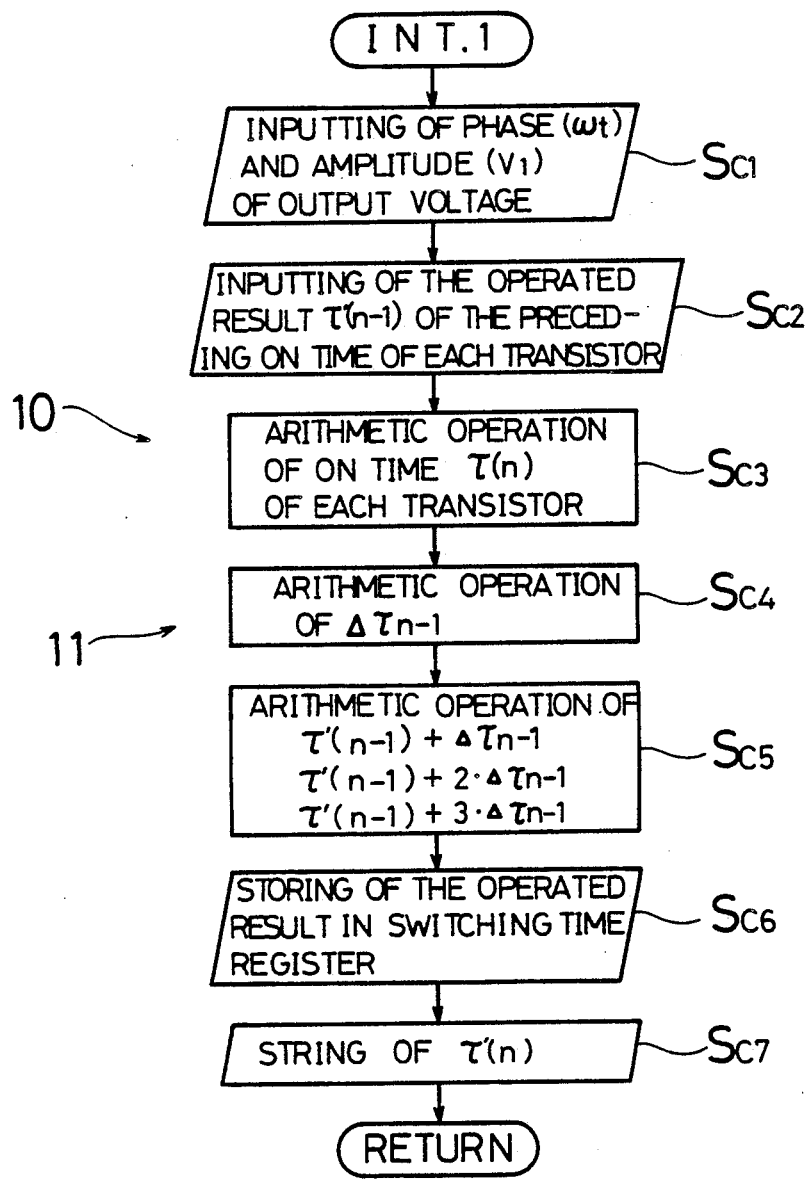

In the flowchart of FIG. 10, at the step $S_{c1}$, the phase $\omega t$ and the amplitude $V_1$ of the output voltage are inputted and at the step $S_{c2}$, the calculated result of the ON time $\tau'(n-1)$ (pulse divided into four) of each transistor (Tra)~(Trc') is inputted.

Therefore, at the step $S_{c3}$, the ON Time $\tau(n)$ of each transistor (Tra)~(Trc') is calculated on the basis of the relative formulae (4) of the PWM control pattern and this ON time is divided into the plural number N(4) of times to obtain divided pulses $\tau'(n)$ and then, at the step $S_{c4}$, according to the difference between the last time and this time, the interpolation value $\Delta \tau n+1$ of the divided pulse $\tau'(n-1)$ of the last time is calculated on the basis of the following formula.

$$\Delta \tau_{n-1} = \{\tau'(n) - \tau'(n-1)\}/N$$

N; number of divisions N=4

At the step $S_{c5}$, so as to interpolate in order four divided pulses $\tau'(n-1)$ of the last time with this interpolation value $\Delta \tau_{n-1}$, each divided pulse $\tau'(n-1)$ (from the second one) is added to $\Delta \tau_{n-1}$, 2 $\Delta \tau_{n-1}$, 3 $\Delta \tau n$-1 in order and at the steps $S_{c6}$ and $S_{c7}$, each divided pulse is stored in the plural N(N=4) switching time registers of each phase, and "RETURN".

Figure 11:
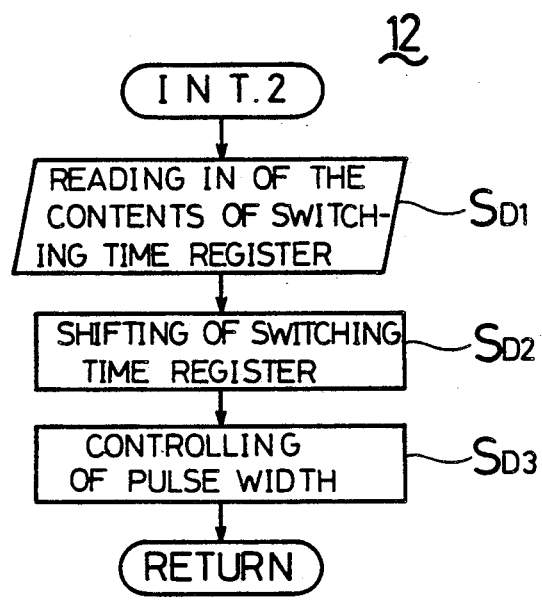
Figure 12:
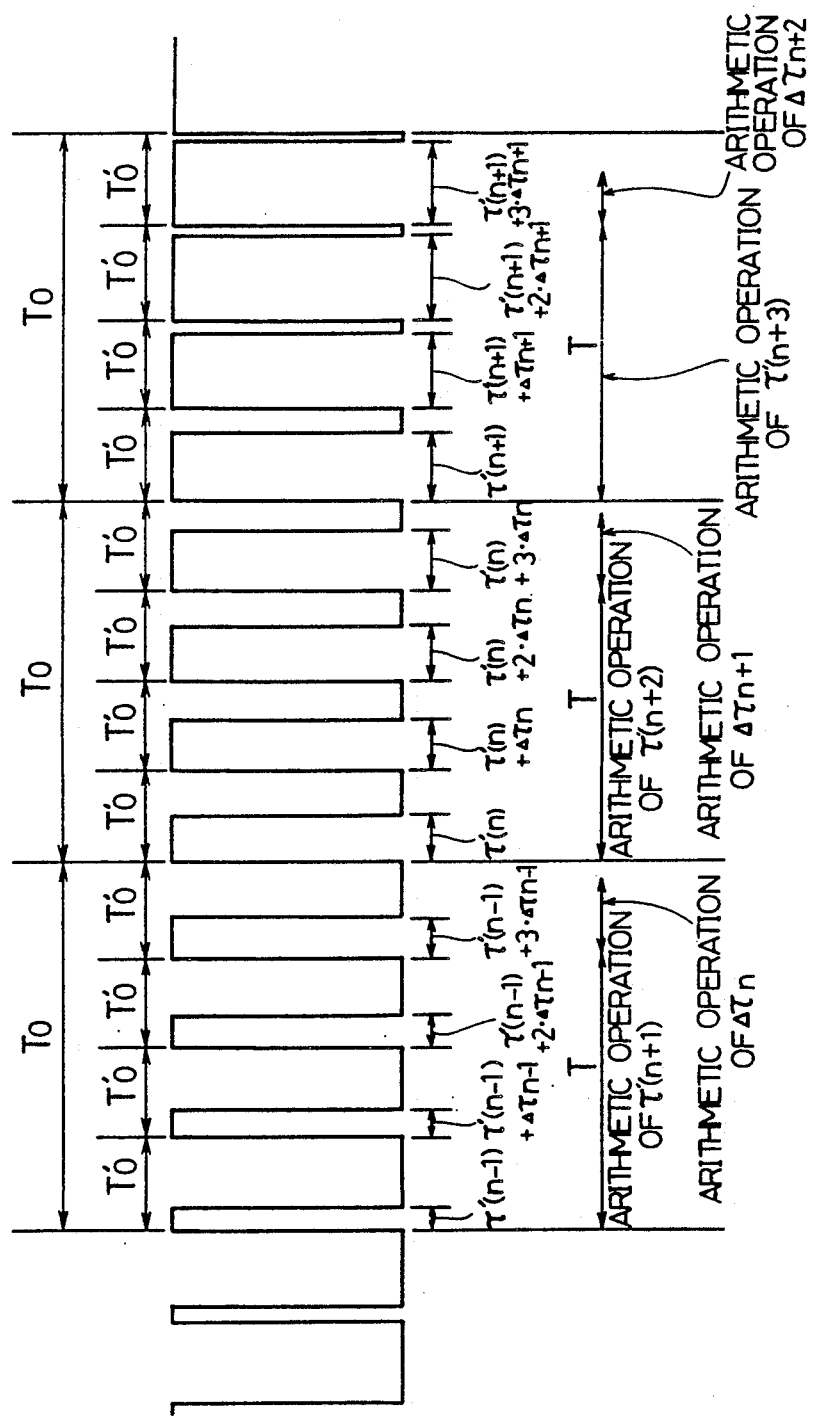

The flowchart of FIG. 11 is for the ON time controlling of each transistor (Tra)~(Trc') with the divided pulse $\tau'$ for the duration from the period $T_0$ to the third period $T_0$ in which the divided pulse $\tau'$ was calculated and stored as shown in FIG. 12. The period $T_0'$ of the control is 1/N (N=number of divisions) of the period $T_0$ for calculation of the flowchart of FIG. 10.

Figure 13:
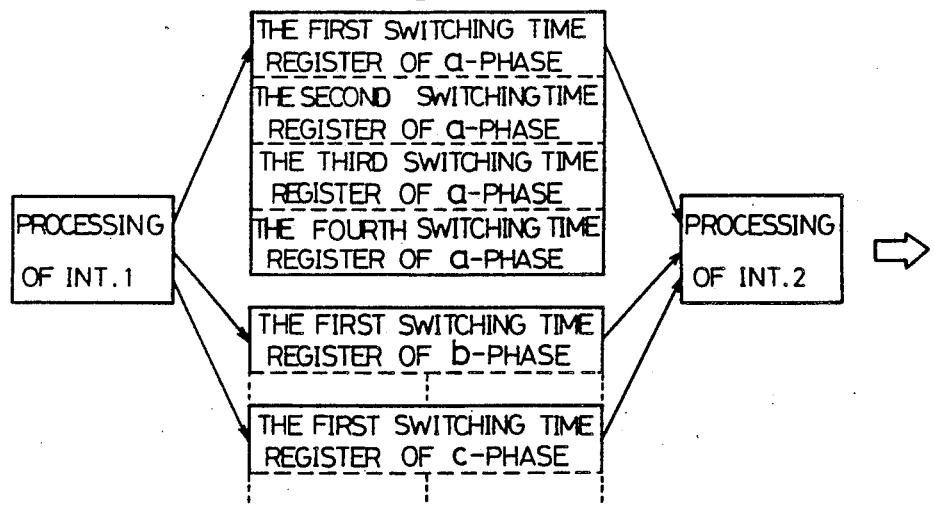

In the flowchart of FIG. 11, at the step $S_{D1}$, the divided pulse $\tau'$ of each phase stored in the first switching time register as shown in FIG. 13 is read in, and at the step $S_{D2}$, the switching time register is shifted and at the step $S_{D3}$, each transistor (Tra)~(Trc') has its ON time controlled by the divided pulse $\tau'(n-1)$ read in, and "RETURN".

Similarly, at every control period $T_0'$, the divided pulse of each phase stored in the second, the third and the fourth switching time registers in order is read in for the ON time controlling of each transistor (Tra)~(Trc').

Thus, the dividing means 11 is provided by which the ON time $\tau$ of each transistor (Tra)~(Trc') calculated by the arithmetic operation means 10 is divided into plural N(N=4) pulses of unequal width $\{\tau', (\tau' + \Delta \tau), (\tau' + 2 \cdot \Delta \tau), (\tau' + 3 \cdot \Delta \tau)\}$.

Figure 14:
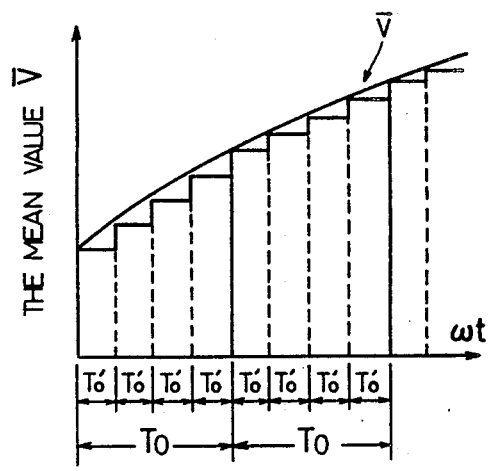

Therefore, in this modified example the division of ON time by the dividing means 11 is carried out for pulses of unequal width as shown by FIG. 12 and if the divided pulse $\tau'$ is outputted at the first period $T'_0$, at the next period $T'_0$ the divided pulse which is larger than the above divided pulse by the interpolated value $\Delta \tau$ is outputted and this is repeated at every period $T'^0$ of control. Therefore, as compared with the case where division of the ON time is carried out for pulses of equal width (the case shown by FIG. 15(a)), as shown in FIG. 14 and FIG. 15(b), the waveform can be reproduced precisely to the mean value $\nabla$ of the output voltage at the control period $T'_0$ corresponding to the equivalent carrier frequency. Also, in the case where the ON time is divided into pulses of unequal width by linear interpolation, the processing time of the microcomputer 8 required for division is comparatively short and the equivalent carrier frequency can be raised.

Figure 16:
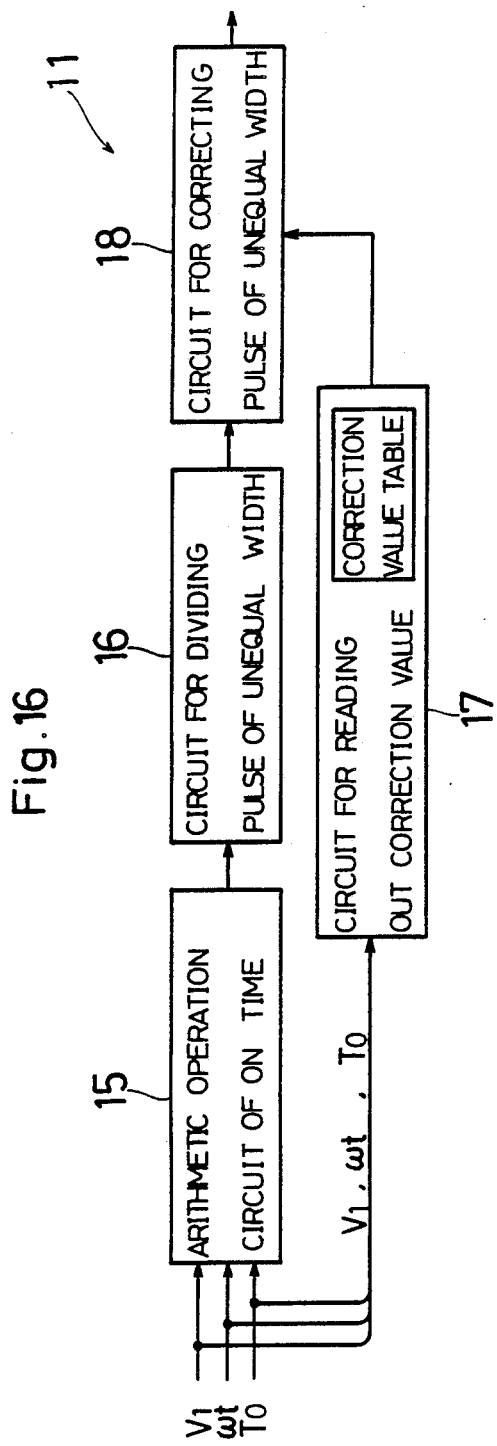
Figure 17:
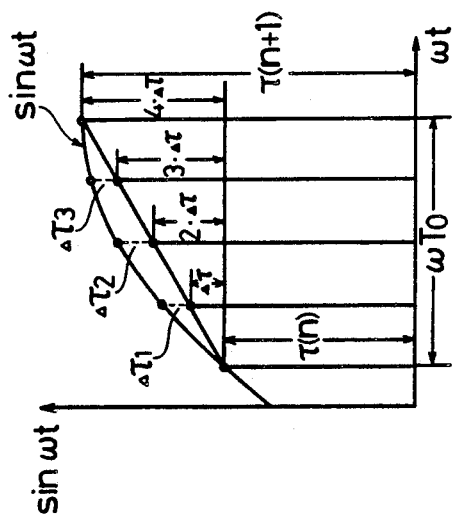

FIG. 16 and FIG. 17 show the second modified example which carries out the division into pulses of unequal width on the basis of the correction value table stored beforehand.

In the case where linear interpolation is carried out as in the case of the first modified example, as shown in FIG. 17, each of the three intermediate pulses of unequal width has an error $\Delta \tau^1$, $\Delta \tau_2$, $\Delta \tau_3$ respectively in relation to the real value of the signal wave ($\sin\omega t$). Since each error $\Delta \tau i$ is necessarily determined only for the shape of a sine wave function (determined by the amplitude $V_1$ and the phase $\omega t$) and the period $T_0$ calculating the ON time, a correction value table which stores beforehand the error $\Delta \tau i$ according to the amplitude $V_1$, the phase $\omega t$ and the calculating period $T_0$ for the ON time is prepared and this correction value table is stored in the microcomputer 8.

FIG. 16 is a block diagram of the microcomputer 8 in the case where division into pulses of unequal width is carried out on the basis of the correction value table. In this figure, reference numeral 15 designates an ON time operation circuit which inputs the amplitude $V_1$ and the phase $\omega t$ of the output voltage and the calculation period $T_0$ of the ON time and the calculation ON time of each transistor (Tra)~(Trc') on the basis of the flowchart of FIG. 6. Reference numeral 16 designates a pulse of unequal width dividing circuit which divides the ON time of each transistor (Tra)~(Trc') calculated by the ON time operation circuit 15 into N(N=4) pulses of equal width and then obtains N(N=4) pulses of unequal width from the pulses of equal width on the basis of the correction value calculated by the linear interpolation by the flowchart of FIG. 10. Reference numeral 17 designates a correction value reading out circuit which inputs the amplitude $V_1$ and the phase $\omega t$ of the output voltage and the calculation period $T_0$ of the ON time and reads out the correction values $\Delta \tau i$ corresponding to them from the correction value table. Reference numeral 18 designates a pulse of unequal width correction circuit which receives the output of the pulse of unequal width correction circuit which receives the output of the pulse of unequal width dividing circuit 16 and the correction value reading out circuit 17 and adds the corresponding correction value $\Delta\tau i$ to each of the $N(N=4)$ pulses of unequal width. Each transistor $(Tra) \sim (Trc')$ has its ON time controlled by the pulse of unequal width corrected by the pulse of unequal width correcting circuit 18.

Thus, the dividing circuit 11 is provided by which the ON time of each transistor $(Tra) \sim (Trc')$ is corrected on the basis of the correction value table and is divided into $N(N=4)$ pulses of unequal width according to the block diagram of the microcomputer 8 of FIG. 16.

In this modified example, as shown in FIG. 17, after linear interpolation, each of three $(N-1)$ intermediate pulses of unequal width can be reproduced precisely in waveform by the corresponding correction value $\Delta\tau i$.

The correction value table can store correction coefficient in lieu of the correction data. In this case, correction is effected by multiplying the amount of change $\Delta\tau$ of the pulse of unequal width by a correction coefficient, as indicated by the following formulae.

$\tau(N)+k_1\Delta\tau$ $\tau(N)+k_2\Delta\tau$ $\tau(N)+k_3\Delta\tau$ $\tau(N)+4\Delta\tau$ where, $k_1$, $k_2$, and $k_3$ are expressed by the following formulae $k_1=(\Delta\tau+\Delta\tau_1)/\Delta\tau$ $k_2=(2\cdot\Delta\tau+\Delta\tau_2)/(2\cdot\Delta\tau)$ $k_3=(3\cdot\Delta\tau+\Delta\tau_3)/(3\cdot\Delta\tau)$ Therefore, in the case of storing the correction coefficient, information of the amplitude $V_1$ is unnecessary and the table size can be reduced.

In the above modified example, division into pulses of unequal width by the dividing means 11 is carried out on the basis of linear interpolation and the corrected value table but it is a matter of course that the other interpolating methods of higher order are applicable to the division into plural pulses of unequal width.

Figure 18:
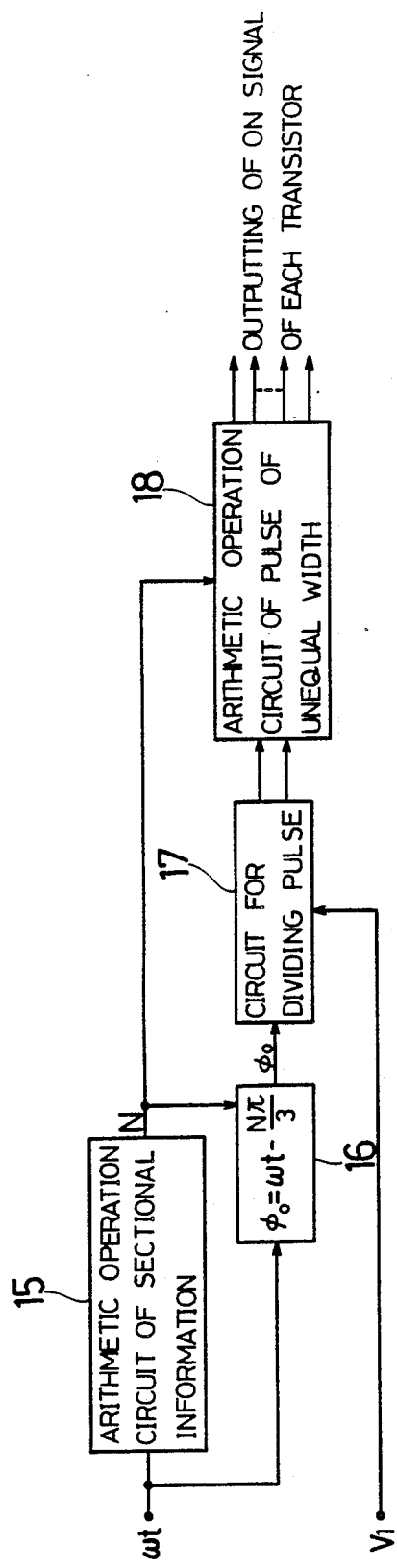

The third modified example is shown in FIG. 18. In FIG. 18, a determination is made according to the rate of change of the ON time as to whether the division of the ON time of each transistor $(Tra) \sim (Trc')$ should be carried out for pulses of equal width or pulses of unequal width.

In this modified example, when a switch choice is provided between division into pulses of equal width (flowcharts of FIG. 6 and FIG. 7) and division into pulses of unequal width (flowcharts of FIG. 10 and FIG. 11) according to the rate of change of the ON time, namely, the phase of the signal wave, the calculation of the ON time of each transistor $(Tra) \sim (Trc')$ and the division of the ON time into the plural number $N(N=4)$ of pulse are carried out equally with the whole phase angle $0 \leq \phi \leq 2\pi$, utilizing the objectivity of the voltage vector, so as to reduce the calculation time still further.

Figure 19:
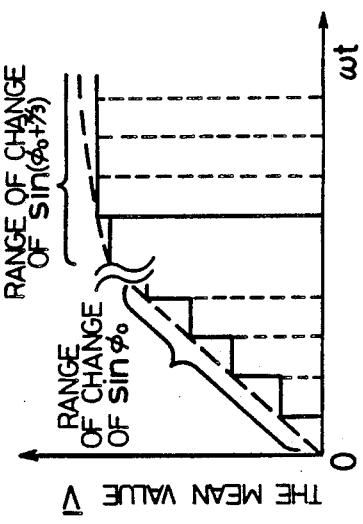

As can be seen from the relative formulae (4) of the PWM control pattern, if the angle $\phi_0$ is within the range of $0 \leq \phi_0 \leq \pi/3$, the ON time $\tau a$ of a transistor is within the range of $Sin(\phi_0+\pi/3)$ as shown in FIG. 19 and the rate of change of the ON time is small. Therefore, division into pulses of equal width in a short calculation time is carried out so as to reproduce the waveform precisely. Since the ON time $\tau b$ of transistor is within the range of $Sin\phi_0$ and its rate of change of the ON time is large, the division into pulses of unequal width is adopted so as to reproduce the waveform precisely. In view of the above circumstances, the ON time of a transistor is divided into pulses of equal width or pulses of unequal width on the basis of the rate of change of the ON time within the whole range of $0 \leq \phi_0 \leq 2\pi$ of angle $\phi_0$.

The above composition with the one-chip microcomputer 8 is explained below, with reference to FIG. 18. In FIG. 18, reference numeral 15 designates a sectional information calculation circuit which discriminates the section N in Table II from the phase $\omega t$. Reference numeral 16 designates an angle calculating circuit which inputs signals (signals of sectional information) N and the phase $\omega t$ of the signal wave outputted from the sectional information calculation circuit 15 and calculates the angle $\phi_0$ by the following formula so as to nufy it within the range of $0 \leq \phi_0 \leq \pi/3$ throughout the whole section N $(N=0 \sim 5)$ from the objectivity of voltage vector.

$\phi_0 = \omega t - (N \cdot \pi/3)$

Reference numeral 17 designates a pulse dividing circuit which inputs the angel $\phi_0$ and the effective value $V_1$ of a voltage of a fundamental wave, calculates the ON time of each transistor $(Tra) \sim (Trc')$ on the basis of the relative formulae (4) of the PWM control pattern, in a fashion similar to the flowchart of FIG. 6, and divides the ON time into plural pulses of equal width. Reference numeral 18 designates a pulse of unequal width calculation circuit which receives the ON time of each transistor $(Tra) \sim (Trc')$ calculated by the pulse dividing circuit 17, divided pulses of equal width and sectional signals N from the section information calculating circuit 15, determines the ON time (function of $Sin0 \sim Sin\pi/3$ in Table II) of transistors $(Tra) \sim (Trc')$ to be divided into pulses of unequal width on the basis of the Table II according to the section N, divides only the ON time which should be divided into pulses of unequal width into plural pulses of unequal width by the linear interpolation based on an operation similar to the flowchart of FIG. 10 and FIG. 11 or by the interplation table of the second modified example and outputs the divided pulses of unequal width and pulses of equal width equally divided by the pulse dividing circuit 17 to the base driver.

Thus, the dividing means 11 is provided which divides the ON time $\tau$ of each transistor $(Tra) \sim (Trc')$ calculated by the arithmetic operation means 10 into $N(N=4)$ pulses of equal width $\tau'$ when the rate of change of the ON time is small (in FIG. 19, angle $\phi_0$ is within the range of $Sin\pi/3 \sim Sin(\phi_0+\pi/3)$ and into $N(N=4)$ pulses of unequal width $\{(\tau'+\Delta\tau), (\tau'+2\cdot\Delta\tau) \ldots \}$ when the rate of change of the ON time is large (in FIG. 19, angle $\phi_0$ is within the range of $Sin0 \sim Sin\pi/3$).

Figure 15A:
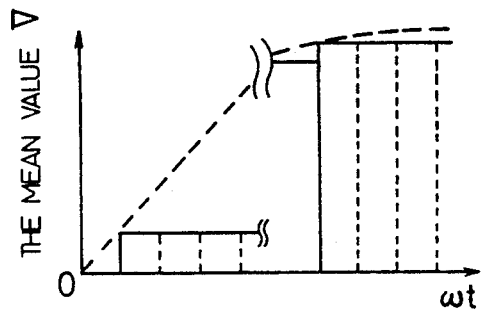
FIGS. 15(a)-(b) are explanatory drawings, each showing the reproduction of a waveform in the case where the ON time is divided into pulses of equal width and into pulses of unequal width.
Figure 15B:
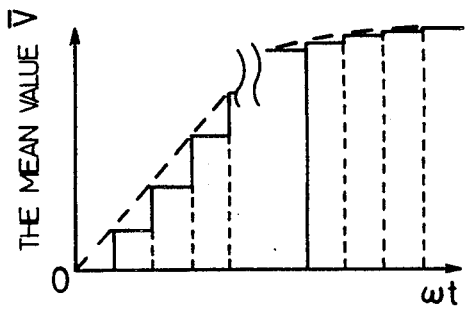

In this modified example, division of the ON time by the dividing means 11 is carried out for pulses of unequal width when the rate of change of the ON time is large as shown by FIG. 19 and therefore as compared with the case where division is carried out for pulses of equal width (the case shown by FIG. 15(a)), the waveform can be reproduced precisely in relation to the mean value $\nabla$ of the output voltage in the control period T'₀ corresponding to the equivalent carrier frequency as shown in FIG. 19.

In this case where the rate of change of the ON time is within a small range, because of a small change, the precision of the waveform reproduction in relation to the mean value v of output voltage, even if division into equal width is carried out, is almost the same as in the case of division in the pulses of unequal width as shown by FIG. 15(b). Also, the calculating time required for the calculation of the interpolation value $\Delta\tau$ is dispensed with by the time in which the ON time is divided into pulses of equal width within a small range of the rate of change. Thus, the processing time for the calculation can be saved, while ensuring good precision of reproduction of the waveform, and as a result, a PWM control using the higher carrier frequency is made possible.

Moreover, the calculation of the PWM control pattern can be carried out equally throughout the whole range $0 \leq \omega t \leq 2\pi$ of $\omega t$ by utilizing the objectivity of the voltage vector and thereafter, it can be easily determined whether the ON time should be divided into pulses of equal width or into pulses of unequal width on the basis of Table II. Thus, this process is suitable for a microcomputer and more simplification of the process is made possible.

Figure 20:
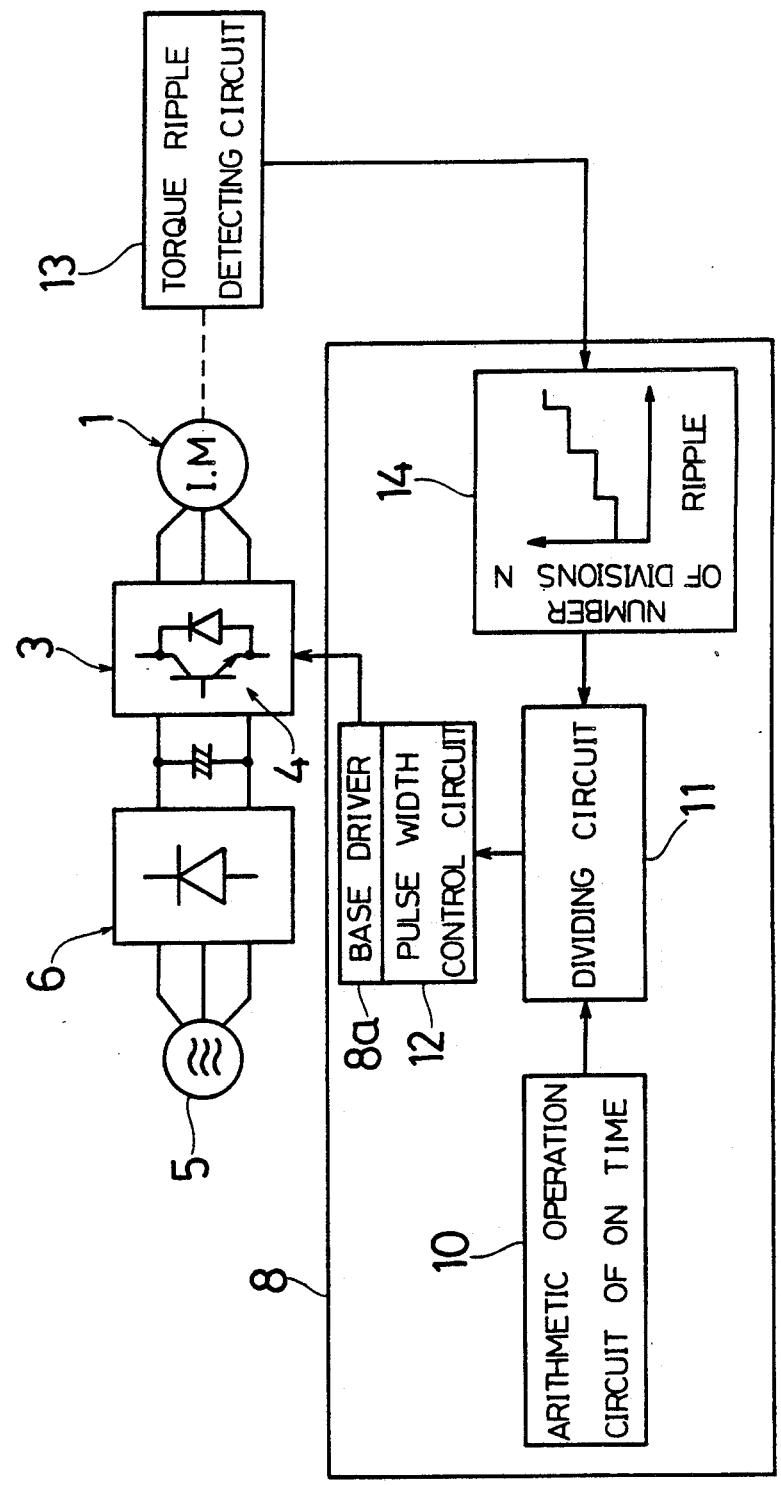

FIG. 20 shows the fourth modified example. While in the above embodiment the number of divisions N of the ON time is made equal to a fixed plural number, (N=4), in this modified example the number of divisions of the ON time is made variable according to the ripple of current flowing through the three-phase winding 2. In FIG. 20, the one-chip microcomputer 8 which forms the PWM control pattern contains the ON time arithmetic operation circuit 10 as an arithmetic operation means which calculates in the same way as the flowchart of FIG. 6, the dividing circuit 11 as a dividing means which divides the ON time of each transistor (Tra)~(Trc') calculated by the ON time arithmetic operation circuit 10 into plural pulses and a pulse-width controlling circuit 12 as a controlling means which controls the ON time of each transistor (Tra)~(Trc') by driving the base driver 8a with pulses divided by the dividing circuit 11.

Reference numeral 13 designates a ripple detecting circuit which detects torque ripple generated by the induction motor 1. Reference numeral 14 is incorporated in the microcomputer 8 and is a number of divisions setting circuit having a number of divisions table in which the value of the number of divisions N of the ON time of the dividing circuit 11 is stored according to the amount of ripple of torque generated by the induction motor 1. The number of divisions N of the number of divisions setting circuit 14 is set so that it becomes larger by stages as the torque ripple becomes larger and is stored. The value of number of divisions N according to the size of the torque ripple detected by the ripple detecting circuit 13 is read out by number of divisions setting circuit 14 and the value of this number of divisions N is outputted to the dividing circuit 11 for the division of the ON time.

Figure 21:
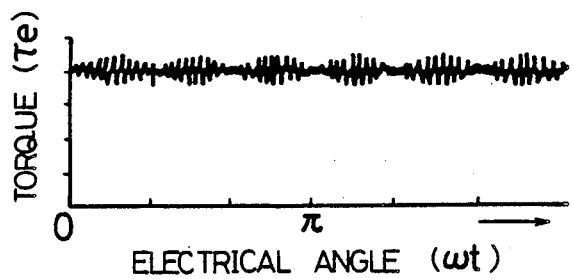

Therefore, in this modified example, the torque ripple generated by the induction motor 1 becomes larger in electrical angle at every $\pi/3$ as shown by FIG. 21. This ripple is detected by the torque ripple detecting circuit 13 and the number of divisions N corresponding to the size of this ripple is set by the number of divisions setting circuit 14. Therefore, in the state where the torque ripple is large, number of divisions is set at a large value and the ON time is divided in more segments than usual in the state where torque ripple is large, with the result that carrier frequency is raised equivalently to the full. Consequently, the torque ripple of the induction motor 1 is restricted effectively and the induction motor 1 is driven to turn at a uniform torque. As can be seen from FIG. 21, the torque ripple is periodic according to the change of phase $\omega t$ and therefore as shown in FIG. 22, provision of the number of divisions setting circuit 14' having a number of divisions table which stores beforehand the number of divisions N corresponding to phase $\omega t$ can dispense with the torque ripple detecting circuit 13.

Figure 22:
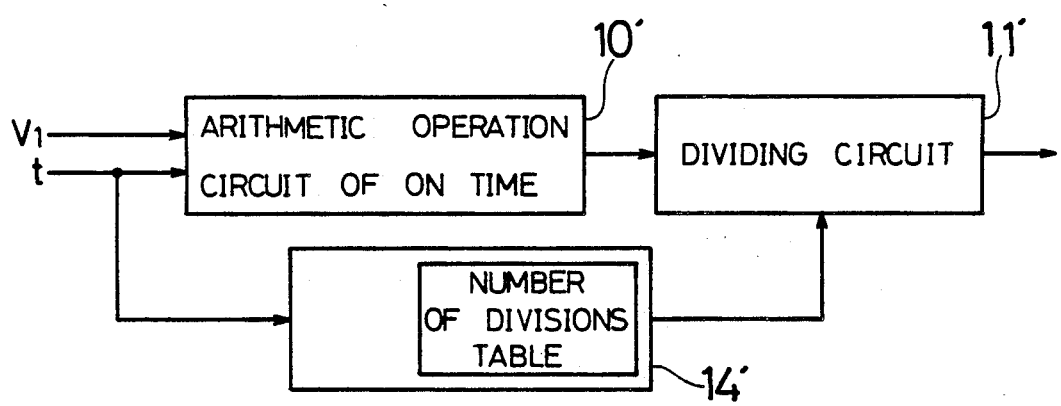
Figure 23:
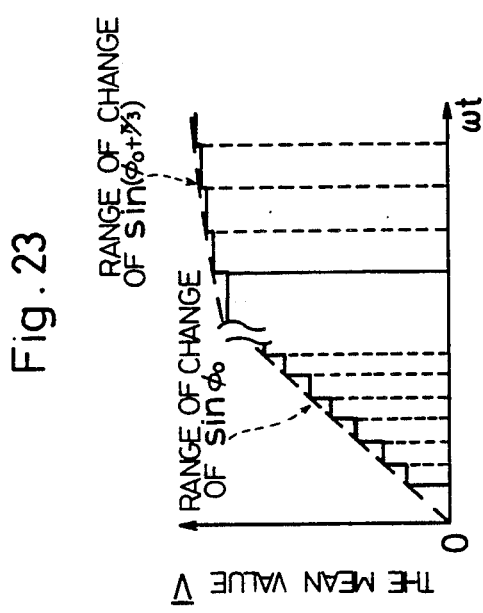

FIG. 22 shows the fifth modified example. In the fourth modified example, the value of number of divisions N for dividing the ON time of each transistor (Tra)~(Trc') is changed according to the torque ripple of the induction motor 1 but in this modified example, in the case where the ripple of current flowing through the three-phase winding 2 and the ripple of voltage are restricted, the number of divisions N is made variable according to phase $\omega t$ of the signal wave, namely, according to the rate of change of the ON time of each transistor (Tra)~(Trc'). In FIG. 22, the number of division table is stored beforehand in the number of divisions setting circuit 14'. As can be seen from the relative formulae (4) of the PWM control pattern, in this table the ON time $\tau$a of a transistor is within the range of Sin($\phi_0$+90 /3) as shown in FIG. 23 when the angle $\phi_0$ is within the range of $0 \leq \phi \leq \pi/3$, for example, and since its rate of change of the ON time is small, the value of the number of divisions N is set at a normal value (N=4, for example). On the other hand, if the ON time $\tau$b of transistor is within the range of Sin$\phi_0$, since its rate of change is large, the value of the number of divisions N is set at a large value (N=8, for example). The value of the number of divisions N is stored within the range of $0 \leq \phi_0 \leq 2\pi$ of angle $\phi_0$, with reference to Table II.

In FIG. 22, in the case where the ON time of each transistor (Tra)~(Trc') calculated by the ON time arithmetic operation circuit 10' is divided into a plural number, the number of divisions N corresponding to the phase $\omega t$ (rate change of the ON time) and the amplitude $V_1$ of output voltage is read out from the number of divisions table and the ON time is divided by this number of divisions N.

Figure 24:
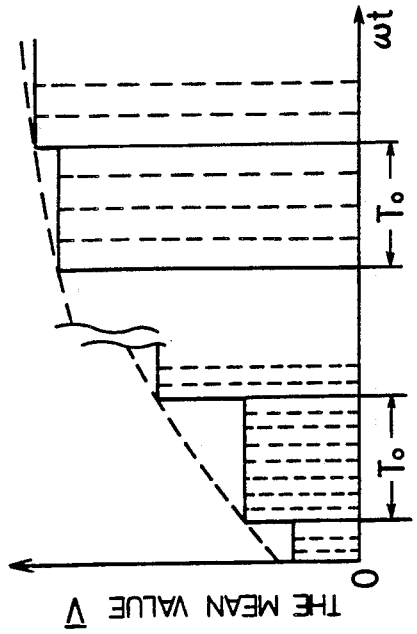
FIG. 23 and FIG. 24 are explanatory drawings, showing the state of reproduction of a waveform.

Therefore, in this modified example, the ON time of each transistor (Tra)~(Trc') calculated by the arithmetic operation means 10' is divided by the number of divisions N which is so set that the larger the rate of change of the ON time $\tau$, the larger the value, as shown by FIG. 23 and FIG. 24 (FIG. 23 is the case of the division into pulses of unequal width and FIG. 24 is the case of division into pulses of equal width) and therefore, the current ripple and the voltage ripple can be effectively restricted.

Figure 25:
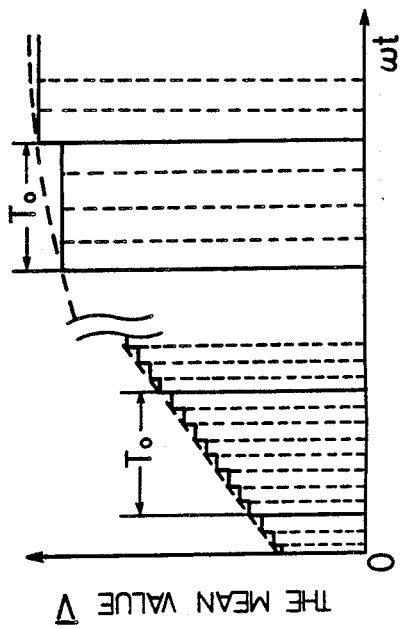

FIG. 25 shows the sixth modified example. In this modified example, in the case where the ON time of each transistor (Tra)~(Trc') is divided by the number of divisions N which is made variable according to the rate of change of the ON time, a proper choice is provided between division into pulses of equal width and division into pulses of unequal width according to the rate of change.

In FIG. 25, among the range of phase of the signal wave shown by broken lines, in the range where the rate of change of the ON time is large, the division of the ON time is carried out for pulses of unequal width and in the range where the phase of the signal wave is small, the division of the ON time is carried out for pulses of equal width. Setting of the number of divisions N is the same as in the case of the fifth modified example.

Therefore, in this sixth modified example, in the range where the rate of change of the ON time is large, the reproduction precision of a signal wave can be raised and in the range where the rate of change of the ON time is small, while reproduction precision of the signal wave can be kept good, the calculation of interpolation values can be dispensed with and processing time can be saved, as compared with the case of division into pulses of unequal width.

In the case where division into many pulses is made by varying the number of divisions N for dividing the ON time of each transistor (Tra)~(Trc'), if the width of the divided pulses is less than equivalent to the short-circuit preventive time Td of arms which are composed at the upper and lower parts of transistor of the inverter 3, the number of pulses should be reduced to prevent vanishment of the pulses and to ensure reproduction precision of a waveform to be recovered.

Figure 26:
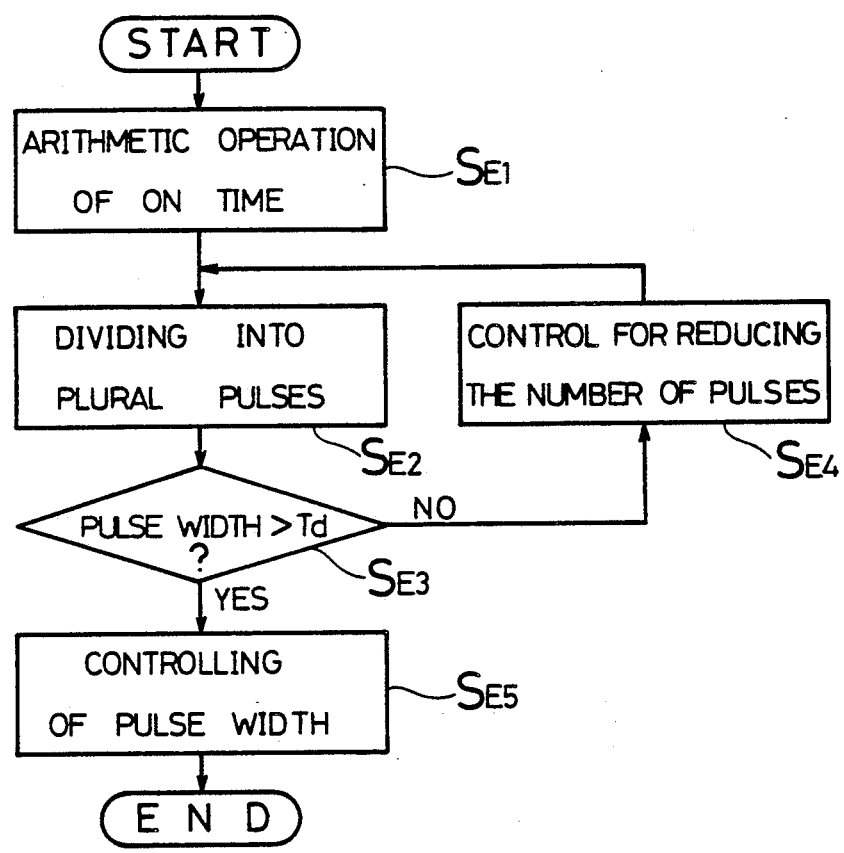

A flowchart for preventing the short-circuit is shown in FIG. 26. In this figure, at the step $S_{E1}$, the start of the ON time of each transistor (Tra)~(Trc') is calculated and at the step $S_{E2}$, the value of the number of divisions N is read out and the ON time of each transistor (Tra)~(Trc') is divided into the plural number N by this number of divisions N.

At the step $S_{E3}$, the width T of the divided pulse is compared with the arm short-circuit preventive time Td and in the case of T≤Td, the output pulse is concluded to vanish and at the step $S_{E4}$, the number of divisions N is reduced and returned to the step $S_{E2}$, where the ON time of each transistor (Tra)~(Trc') is divided by the reduced number of divisions N.

If at the step $S_{E3}$, T>Td is observed and the pulse will not vanish, at the step $S_{E5}$, each transistor (Tra)~(Trc') has its ON time controlled at every period $T_0'$ by this divided pulse, and "END".

We claim:

1. A pulse-width modulation control unit for an inverter having a bridge circuit connected to a three-phase winding and having a plurality of switching elements, whereby a D.C. voltage is pulse-width modulated by an ON/OFF operation of each switching element of said bridge circuit and a three-phase A.C. voltage is supplied to said three-phase winding, said control unit comprising:
   an arithmetic operation means for calculating an ON time of each switching element at a calculation period corresponding to a carrier frequency;
   a dividing means for dividing the ON time of each switching element calculated by said arithmetic operation means; and
   a controlling means for controlling the ON time of each switching element by a plurality of pulses obtained by dividing the ON time into said plurality of pulses by said dividing means.

2. A pulse-width modulation control unit for an inverter according to claim 1, wherein the ON time of each switching element is equally divided into a fixed preset number of pulses.

3. A pulse-width modulation control unit for an inverter according to claim 1, wherein the dividing means divides the ON time of each switching element into plural pulses of unequal width.

4. A pulse-width modulation control unit for an inverter according to claim 3, wherein the dividing means divides the ON time of each switching element into plural pulses of unequal width by linear interpolation so that the width of a divided pulse changes in equal variations of width.

5. A pulse-width modulation control unit for an inverter according to claim 3, wherein the dividing means divides the ON time of each switching element into plural pulses of equal width and then divides said plural pulses of equal width into plural pulses of unequal width on the basis of a correction value table stored beforehand according to the phase of the three-phase A.C. voltage.

6. A pulse-width modulation control unit for an inverter according to claim 1, wherein the dividing means divides the ON time of each switching element into plural pulses of equal width when the rate of change of the ON time is within one predetermined range and divides the ON time into plural pulses of unequal width when the rate of change of the ON time is within another predetermined range.

7. A pulse-width modulation control unit for an inverter according to claim 6, wherein the dividing means divides the ON time of each switching element into pulses of unequal width when the rate of change of the ON time is large and into pulses of equal width when the rate of change of the ON time is small.

8. A pulse-width modulation control unit for an inverter according to claim 6, wherein the dividing means, when dividing the ON time of each switching element into pulses of equal width, divides the ON time into a fixed preset plural number of pulses and when dividing the ON time into pulses of unequal width, divides the ON time by linear interpolation so that the divided pulse width changes between adjacent pulses are equal in width.

9. A pulse-width modulation control unit for an inverter according to claim 6, wherein the dividing means, when dividing the ON time of each switching element into pulses of unequal width, divides the ON time first into plural pulses of equal width and then divides said plural pulses of equal width into pulses of unequal width on the basis of a correction value table stored beforehand according to the phase of the three-phase A.C. voltage.

10. A pulse-width modulation control unit for an inverter according to claim 1, wherein the arithmetic operation means calculates the ON time of each switching element at a calculation period corresponding to a carrier frequency on the basis of one of the following two sets of calculation formulae within the range of $0 \sim \pi/3$ of the phase $\phi_0$ of the three-phase A.C. voltage:

$$\tau_a^-/T_0 = 1 - \sqrt{2} \cdot (V_1/V_d) \cdot \sin(\phi_0 + \pi/3) \quad (4)$$

$$\tau_b^-/T_0 = 1 - \sqrt{2} \cdot (V_1/V_d) \cdot \sin\phi_0$$

$$\tau_c^-/T_0 = 1$$

and $$\tau a^+/T_0 = 1$$

$$\tau b^-/T_0 = \sqrt{2} \cdot (V_1/Vd) \cdot \sin(\pi/3 - \phi_0)$$

$$\tau c^-/T_0 = \sqrt{2} \cdot (V_1/Vd) \cdot \sin(\phi_0 + \pi/3)$$

($\tau a^-, \tau a^+, \tau b^-, \tau c^-$ are respective ON times of switching element of a phase, b phase and c phase on (+) side and (−) side, $T_0$=period, $V_1$=effective voltage of a fundamental wave, $Vd$=the D.C. voltage to be supplied) and specifies the ON time of each switching element within the range of $\pi/3 \sim 2\pi$ of the phase $\phi_0$ based on the ON time calculated on the basis of the above calculation formulae and a permutation table of switching elements set according to the phase $\phi_0$ within the range of $0 \sim 2\pi$.

11. A pulse-width modulation control unit for an inverter according to claim 10, wherein the arithmetic operation means has an ON time table in which is stored a desired ON time of each switching element within the range of $0 \sim \pi/3$ of the phase $\phi_0$, said ON time being calculated beforehand on the basis of said calculation formulae, and wherein said arithmetic operation means obtains the ON time from said ON time table.

12. A pulse-width modulation control unit for an inverter according to claim 1, wherein said dividing means divides the ON time of each switching element into plural pulses corresponding to a ripple based on current flowing through said three-phase winding.

13. A pulse-width modulation control unit for an inverter according to claim 12, wherein said dividing means divides the ON time of each switching element into plural pulses whose number corresponds to the rate of change of the ON time.

14. A pulse-width modulation control unit for an inverter according to claim 13, wherein the dividing means provides plural pulses which are divided pulses of equal width when the rate of change of the ON time of each switching element is within one predetermined range and which are divided pulses of unequal width when the rate of change is within another predetermined range.

* * * * *